US011986693B2

(12) United States Patent
Cho et al.

(10) Patent No.: US 11,986,693 B2
(45) Date of Patent: May 21, 2024

(54) WEARABLE DEVICE USING FLEXIBLE NON-POWERED VARIABLE IMPEDANCE MECHANISM

(71) Applicant: Seoul National University R&DB Foundation, Seoul (KR)

(72) Inventors: Kyu-Jin Cho, Seoul (KR); Sung-Sik Yun, Seoul (KR)

(73) Assignee: Seoul National University R&DB Foundation, Seoul (KR)

( * ) Notice: Subject to any disclaimer, the term of this patent is extended or adjusted under 35 U.S.C. 154(b) by 253 days.

(21) Appl. No.: 17/295,762

(22) PCT Filed: Oct. 30, 2019

(86) PCT No.: PCT/KR2019/014441
§ 371 (c)(1),
(2) Date: May 20, 2021

(87) PCT Pub. No.: WO2020/105890
PCT Pub. Date: May 28, 2020

(65) Prior Publication Data
US 2022/0008776 A1  Jan. 13, 2022

(30) Foreign Application Priority Data

Nov. 21, 2018 (KR) .................. 10-2018-0144530
Oct. 25, 2019 (KR) .................. 10-2019-0133985

(51) Int. Cl.
*A63B 21/04* (2006.01)
*A63B 21/00* (2006.01)
(Continued)

(52) U.S. Cl.
CPC .... *A63B 21/0407* (2013.01); *A63B 21/00076* (2013.01); *A63B 21/00181* (2013.01);
(Continued)

(58) Field of Classification Search
CPC .......... A63B 21/0407; A63B 21/00076; A63B 21/00181; A63B 21/0552;
(Continued)

(56) References Cited

U.S. PATENT DOCUMENTS

| 807,908 A | * | 12/1905 | Bradstreet | ............ A63B 22/001 482/51 |
| 5,647,827 A | * | 7/1997 | Gutkowski | ........ A63B 21/4025 482/122 |

(Continued)

FOREIGN PATENT DOCUMENTS

| JP | 2005160982 A | 6/2005 |
| KR | 20160120835 A | 10/2016 |

(Continued)

OTHER PUBLICATIONS

International Search Report of the ISA/KR in PCT/KR2019/014441, dated Feb. 19, 2020; 2pgs.

*Primary Examiner* — Joshua Lee
*Assistant Examiner* — Catrina A Letterman
(74) *Attorney, Agent, or Firm* — Haukaas Fortius PLLC; Michael Haukaas; Paul K. Judd

(57) ABSTRACT

The present invention relates to a wearable device using a flexible non-powered variable impedance mechanism, wherein the device can induce a user to have a correct posture during a squat exercise or lifting work, and can assist the user's muscular strength. According to the present invention, an angle between a (1-1)th lower string and a (1-2)th lower string and an angle between a (24)th lower string and
(Continued)

a (2-2)th lower string change according to a knee angle depending on the user's posture, whereby an impedance mechanism that the user feels through the body changes.

8 Claims, 8 Drawing Sheets

(51) Int. Cl.
  *A63B 21/055* (2006.01)
  *A63B 23/04* (2006.01)
(52) U.S. Cl.
  CPC ...... *A63B 21/0552* (2013.01); *A63B 21/4005* (2015.10); *A63B 21/4015* (2015.10); *A63B 2023/0411* (2013.01)
(58) Field of Classification Search
  CPC ........ A63B 2023/0411; A63B 69/0059; A63B 69/0062; A63B 71/0054; A63B 23/0405; A63B 2071/0072; A63B 21/4001–4025; A63B 21/065; A63B 21/05–0557; B25J 9/00; B25J 11/00; A62B 35/00–04
  See application file for complete search history.

(56) References Cited

U.S. PATENT DOCUMENTS

| | | | | |
|---|---|---|---|---|
| 6,099,446 | A * | 8/2000 | Johnson | A63B 21/4005 482/124 |
| 6,428,495 | B1 * | 8/2002 | Lynott | A61F 5/3715 602/23 |
| 2005/0282689 | A1 * | 12/2005 | Weinstein | A63B 21/0552 482/121 |
| 2012/0202658 | A1 * | 8/2012 | Menefee, Sr. | A63B 21/4005 482/124 |
| 2014/0171276 | A1 * | 6/2014 | Strachan | A63B 21/0557 482/124 |
| 2015/0251038 | A1 * | 9/2015 | Bybee | A63B 21/4025 482/124 |
| 2016/0059053 | A1 | 3/2016 | Seman et al. | |
| 2019/0030708 | A1 * | 1/2019 | Holgate | B25J 9/0006 |
| 2019/0201731 | A1 * | 7/2019 | Nguyen | A63B 21/4015 |
| 2021/0401610 | A1 * | 12/2021 | Cainzos Perez | A61F 5/026 |
| 2022/0047004 | A1 * | 2/2022 | Betts | A63B 21/4009 |

FOREIGN PATENT DOCUMENTS

| | | |
|---|---|---|
| KR | 20170006367 A | 1/2017 |
| WO | 2010058046 A1 | 5/2010 |

* cited by examiner

WEARABLE DEVICE USING FLEXIBLE NON-POWERED VARIABLE IMPEDANCE MECHANISM

RELATED APPLICATIONS

This application is a National Stage filing under 35 U.S.C. § 371 of International Application No. PCT/KR2019/014441 filed Oct. 30, 2019, which claims priority to Korean Patent Application Nos. 10-2019-0133985, filed Oct. 25, 2019 and 10-2018-0144530, filed Nov. 21, 2018, which applications are incorporated herein by reference.

BACKGROUND OF THE DISCLOSURE

Field of the Disclosure

The present disclosure relates to a wearable device using a flexible non-powered variable impedance mechanism, and more particularly, to a wearable device using a flexible non-powered variable impedance mechanism capable of inducing a user to have a correct posture during a squat exercise or lifting work and assisting the user's muscular strength.

Related Art

In general, a squat exercise is an exercise for strengthening low extremity muscles and is used not only for training programs for strengthening the trunk and lower body muscles but also for knee rehabilitation, and it is also widely used for health management of the general public. This squat exercise is in the form of a closed kinetic chain exercise of the lower extremity, which corresponds to an exercise that uses multiple joints of the human body and produces cooperative contractions in muscles such as a quadriceps femoris muscle, a psoas major muscle, an erector spinae, and a hamstring muscle.

Incorrect alignment of the legs during the squat exercise increases a load on the knee joint to cause knee injury. If the center of weight is tilted forward, an injury to the lower back increases, and thus, a correct alignment of the body is an important factor during the squat exercise to prevent a body injury. Therefore, exercise equipment such as the Smith machine, which guides the body in a predetermined direction during the squat exercise, helps to take a correct posture and reduces a risk of injury. However, such exercise equipment is very large in size, occupies a lot of space, and is not portable, and thus, there are many restrictions in terms of use.

Meanwhile, in workplaces, transport companies, and construction sites where objects (or goods) are frequently lifted, objects are lifted or lowered through a posture similar to the squat exercise, that is, lifting work. It is well known that there is a high risk of injury if a person (or a worker) takes a posture of hunching his/her back when performing such lifting work. However, compared to a motion of bending the legs, it is more comfortable and natural to bow the back, so workers tend to lift objects with their backs bent for convenience or inadvertently. These incorrect movements are prone to cause injury to the back or knees.

Accordingly, assisting muscle strength of the motion of bending the leg, while suppressing the motion of bending the back, may induce the user's correct posture to prevent an injury and achieve convenience of work, but equipment for assisting in the lifting work of workers has not been developed yet.

SUMMARY

The present disclosure provides a wearable device using a flexible non-powered variable impedance mechanism capable of inducing a user to have a correct posture during a squat exercise or lifting work and assisting the user's muscular strength by guiding the user to move his/her body along a determined trace.

In an aspect, a wearable device using a flexible non-powered variable impedance mechanism includes: a connection portion located on the user's back and located between the user's neck and bottom; an upper cable including a first upper string having one side worn on one side of an upper body of the user located above the connection portion and the other side extending in a direction of the connection portion, a second upper string having one side worn on the other side of the upper body of the user located above the connection portion and the other side extending in the direction of the connection portion, and an upper connection string, in a state of being caught at one side of the connection portion, having one side integrally connected to the first upper string and the other side integrally connected with the second upper string; a lower cable including a first lower string having one side provided on a first leg among a pair of legs of the user and the other side extending in a direction of the connection portion, a second lower string having one side provided on a second leg among the pair of legs of the user and the other side extending in a direction of the connection portion, and a lower connection string, in a state of being caught at the other side of the connection portion, having one side integrally connected with the first lower string and the other side integrally connected to the second lower string; and an elastic portion connecting the first lower string and the second lower string and formed of an elastic material.

A first connection portion and a second connection portion may be mounted on both sides of the elastic portion, respectively, the first lower string may include a (1-1)th lower string (first lower body string) having one side connected to one side of the lower connection string and the other side connected to one side of the first connection portion and a (1-2)th lower string (first lower leg string) having one side connected to the other side of the first connection portion and the other side provided on the first leg of the user, and the second lower string may include a (2-1)th lower string (second lower body string) having one side connected to the other side of the lower connection string and the other side connected to one side of the second connection portion and a (2-2)th lower string (second lower leg string) having one side connected to the other side of the second connection portion and the other side provided on the second leg of the user.

When the user bends his or her knees, while moving the knees outward, the (1-2)th lower string (first lower leg string) and the (2-2)th lower string (second lower leg string) may be folded in a direction away from the (1-1)th lower string (first lower body string) and the (2-1)th lower string (second lower body string), so that a distance between the (1-2)th lower string (first lower leg string) and the (2-2)th lower string (second lower leg string) may increase, and as the distance between the (1-2)th lower string (first lower leg string) and the (2-2)th lower string (second lower leg string) increases, the lower connection string may induce the upper cable to move downward and the upper cable may induce the upper body of the user to be straightened.

When the user bends the upper body in a state in which the user does not bend the knees, the (1-2)th lower string (first lower leg string) and the (2-2)th lower string (second lower leg string) may be moved closer to the (1-1)th lower string (first lower body string) and the (2-1)th lower string (second lower body string) in a straight line, tension of the upper cable and the lower cable may increase, and the upper cable and the lower cable apply pressure in a direction in which the upper body of the user is straightened.

One side of the first upper string may be worn on a first shoulder, among a pair of shoulders located at the upper body of the user, and one side of the second upper string may be worn on a second shoulder among the pair of shoulders located at the upper body of the user.

One side of the first lower string may be worn on a first foot connected to the first leg of the user, and one side of the second lower string may be worn on a second foot connected to the second leg of the user.

The wearable device may further include: a first band worn to wrap around a first knee provided on the first leg of the user and a second band worn to wrap around a second knee provided on the second leg of the user, wherein the first lower string may extend in a direction of the first foot of the user in a state of being connected to the first band, and the second string may extend in a direction of the second foot of the user in a state of being connected to the second band.

The wearable device may further include: a first knee string having a ring shape and having one side coupled to the first foot of the user and the other side coupled to an upper side of the first lower string by passing through a front side of the first band; and a second knee string having a ring shape and having one side coupled to the second foot of the user and the other side coupled to an upper side of the second lower string by passing through a front side of the second band, wherein the first knee string and the second knee string may each be formed of an elastic material, and when the user bends the first knee and the second knee, tension based on elasticity of the first knee string and the second knee string located at the front of the first band and the second band may increase so that the first knee string and the second knee string may apply pressure in a direction in which the first knee and the second knee are spread.

A first front tunnel may be formed at a front of the first band to guide the first knee string, a first rear tunnel may be formed at a rear of the first band to guide the first lower string, a second front tunnel may be formed at a front of the second band to guide the second knee string, and a second rear tunnel may be formed at a rear of the second band to guide the second lower string.

The elastic portion may be located between the user's bottom and knees.

Advantageous Effects

In the present disclosure, an angle between the ((1-1)th lower string (first lower body string) and the ((1-2)th lower string (first lower leg string) and an angle between the ((2-1)th lower string (second lower body string) and the ((2-2)th lower string (second lower leg string) are changed according to an angle of the knee that the user takes, and as a result, an impedance mechanism experienced by the user may be changed.

In addition, as a distance between the first lower string and the second lower string increases, more energy is stored in the elastic portion, and thus, when the user takes a posture of getting up, the elastic portion assists the user's muscle strength like a spring, allowing the user to work with less fatigue than before in the process of lifting an object or taking a posture of getting up, thereby increasing work efficiency.

In addition, since tension of the upper cable and lower cable increases as the upper cable moves upward, the upper cable and lower cable interfere with the user bending his/her back and the user feels that the motion of bending the back is limited to recognize the motion is wrong and do exercise or work in a correct posture.

In addition, the first and second knee strings apply pressure in a direction in which the user's knees are stretched, so that when the user performs the motion of stretching the knees, the first and second knee strings assist the user's muscle strength.

In addition, when the user performs squat movement, an exercise posture is accurately guided so that the knee is bent while the knee moves outward, beginners who are prone to injuries due to the unfamiliar squat position may be guided to perform the squat movement in the correct position.

In addition, since a simple structure that allows the upper cable, the lower cable, and the elastic portion to be worn on the body is provided, an exercise device having power such as a separate machine is not required, so that the user may wear the present disclosure anytime, anywhere and may easily perform the squat movement.

In addition, since the operator is induced to lift an object in the correct posture or lower the object safely during the lifting work process, injury to the operator may be prevented and convenience of work may be achieved.

Detailed Description of Main Elements

| | |
|---|---|
| 1000: wearable device using flexible non-powered variable impedance mechanism | |
| 100: connection portion | 200: upper cable |
| 210: first upper string | 220: second upper string |
| 230: upper connection string | 300: lower cable |
| 310: first lower string | 312: (1-1)th lower string (first lower body string) |
| 314: (1-2)th lower string (first lower leg string) | 320: second lower string |
| 322: (2-1)th lower string (second lower body string) | 324: (2-2)th lower string (second lower leg string) |
| 330: lower connection string | 400: elastic portion |
| 410: first connection portion | 420: second connection portion |
| 500: first band | 502: first front tunnel |
| 504: first rear tunnel | 510: second band |
| 512: second front tunnel | 514: second rear tunnel |
| 600: first knee string | 610: second knee string |

DESCRIPTION OF EXEMPLARY EMBODIMENTS

Hereinafter, a wearable device using a flexible non-powered variable impedance mechanism according to an embodiment of the present disclosure will be described in more detail with reference to the accompanying drawings.

Figure 1:
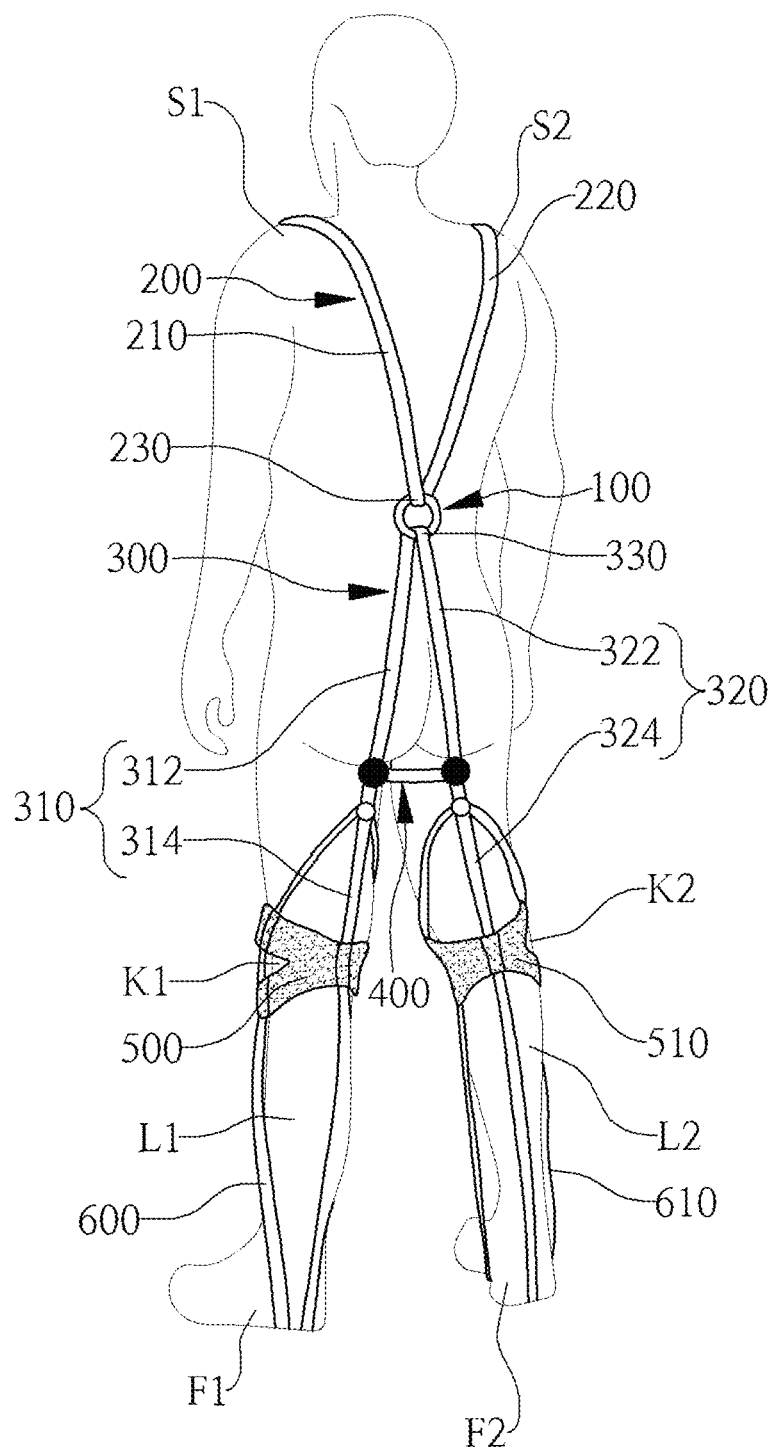
FIG. 1 is a diagram schematically illustrating a state in which a user wears a wearable device using a flexible non-powered variable impedance mechanism according to an embodiment of the present disclosure.
Figure 2:
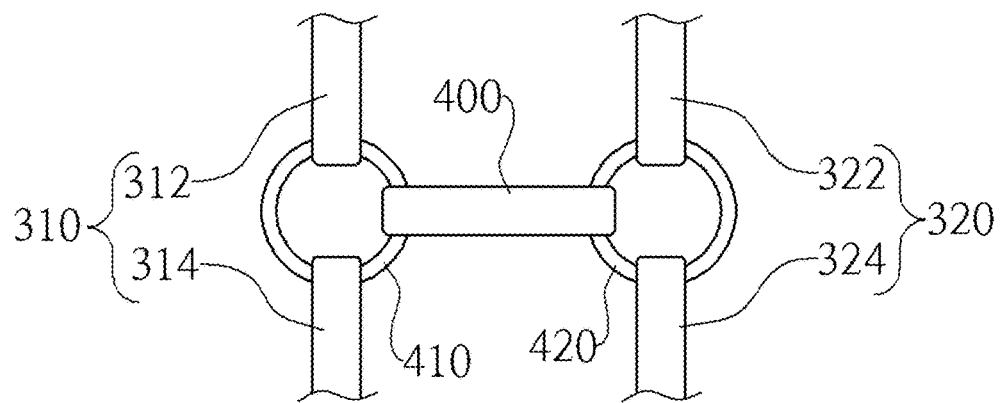
FIG. 2 is a diagram schematically illustrating a coupling structure between a lower string and an elastic portion of a wearable device using a flexible non-powered variable impedance mechanism according to an embodiment of the present disclosure.

FIG. 1 is a view schematically illustrating a state in which a user wears a wearable device using a flexible non-powered variable impedance mechanism according to an embodiment of the present disclosure, and FIG. 2 is a diagram schematically illustrating a coupling structure between a lower string and an elastic portion of a wearable device using a flexible non-powered variable impedance mechanism according to an embodiment of the present disclosure.

Referring to FIGS. 1 and 2, a wearable device 1000 using a flexible non-powered variable impedance mechanism according to an embodiment of the present disclosure is formed to be worn on a user's body and includes a connection portion 100, an upper cable 200, a lower cable 300, and an elastic portion 400, and may further include first and second bands 500 and 510 and first and second knee strings 600 and 610.

The connection portion 100 is located on the back of the user's upper body, and specifically, is located between the neck and the buttocks. The connection portion 100 interconnects the upper cable 200 and the lower cable 300 and may be formed in a ring shape, for example.

The upper cable 200 and the lower cable 300 are formed of a fabric, string, etc., and may be formed of a material having no elasticity. The upper cable 200 includes a first upper string 210, a second upper string 220, and an upper connection string 230. One side of the first upper string 210 is worn on one side of the upper body of the user positioned above the connection portion 100 and the other side extends in a direction of the connection portion 100. One side of the first upper string 210 is worn on a first shoulder S1 among a pair of shoulders located on the upper body of the user, and to this end, the one side of the first upper string 210 may be formed to wrap around the first shoulder S1 in the form of a shoulder strap of a backpack. One side of the second upper string 220 is worn on the other side of the user's upper body positioned above the connection portion 100 and the other side thereof extends in a direction of the connection portion 100. One side of the second upper string 220 is worn on a second shoulder S2 among the pair of shoulders located on the upper body of the user, and to this end, one side of the second upper string 220 may be formed to wrap around the second shoulder S2 in the form of a shoulder strap of a backpack. The upper connection string 230 is positioned so as to be caught on the upper side of the connection portion 100, in a state of being inserted into one side of the connection portion 100. In addition, one side of the upper connection string 230 is integrally connected with the first upper string 210, and the other side of the upper connection string 230 is integrally connected with the second upper string 220.

The lower cable 300 includes a first lower string 310, a second lower string 320, and a lower connection string 330. One side of the first lower string 310 is provided on a first leg L1 among a pair of legs of the user, and the other side thereof extends in a direction of the connection portion 100. One side of the second lower string 320 is provided on a second leg L2 among the pair of legs of the user, and the other side thereof extends in the direction of the connection portion 100. The lower connection string 330 is inserted into the other side of the connection portion 100 and is positioned to be caught at a lower portion of the connection portion 100. In addition, one side of the lower connection string 330 is integrally connected with the first lower string 310, and the other side of the lower connection string 330 is integrally connected with the second lower string 320.

The elastic portion 400 is formed of an elastic material, and may be formed of, for example, an elastic cable, a rubber band, or an elastic spring. The elastic portion 400 is located between the user's hip and knees and connects the first lower string 310 and the second lower string 320 to each other. In addition, a first connection portion 410 and a second connection portion 420 are mounted on both sides of the elastic portion 400 so as to be connected to the first and second lower strings 310 and 320, respectively. The first connection portion 410 and the second connection portion 420 are formed in a ring shape, for example.

In addition, the first lower string 310 includes a (1-1)th lower string 312 (first lower body string) and a (1-2)th lower string 314 (first lower leg string) to be connected to the first connection portion 410. One side of the (1-1)th lower string 312 (first lower body string) is connected to one side of the lower connection string 330 and the other side thereof is connected to one side of the first connection portion 410.

One side of the (1-2)th lower string 314 (first lower leg string) is connected to the other side of the first connection portion 410 and the other side thereof is provided on the first leg L1 of the user. The second lower string 320 includes a (2-1)th lower string 322 (second lower body string) and a (2-2)th lower string 324 (second lower leg string) to be connected to the second connection portion 420. One side of the (2-1)th lower string 322 (second lower body string) is connected to the other side of the lower connection string 330 and the other side thereof is connected to one side of the second connection portion 420. One side of the (2-2)th lower string 324 (second lower leg string) is connected to the other side of the second connection portion 420 and the other side thereof is provided on the user's second leg L2. A lower end of the (1-2)th lower string 314 (first lower leg string) extends in a direction of a first foot F1 connected to the user's first leg L1 and is worn on the first foot F1, and a lower end of the (2-2)th lower string 324 (second lower leg string) extends in a direction of a second foot F2 connected to the user's second leg L2 and is worn on the second foot F2.

Figure 3:
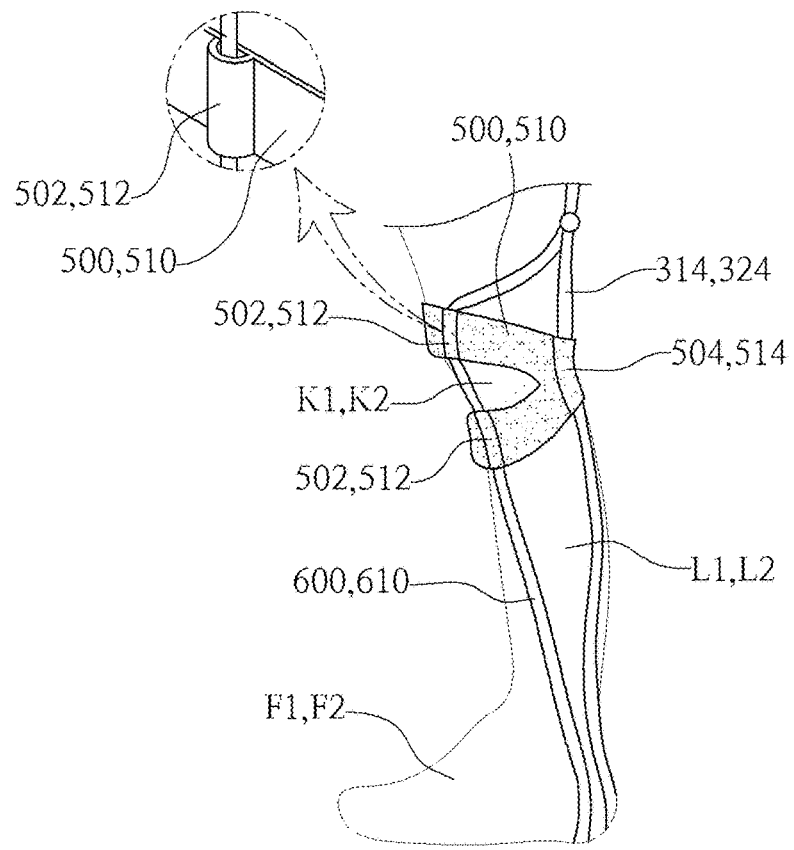
FIG. 3 is a diagram schematically illustrating a state in which a band of a wearable device using a flexible non-powered variable impedance mechanism according to an embodiment of the present disclosure is worn on a user's knee.

FIG. 3 is a diagram schematically illustrating a state in which a band of a wearable device using a flexible non-powered variable impedance mechanism according to an embodiment of the present disclosure is worn on a user's knee.

Referring to FIGS. 1 to 3, the first band 500 is worn to wrap a first knee K1 provided on the first leg L1 of the user. A second band 510 is worn to wrap a second knee K2 provided on the user's second leg L2. Each of the first and second bands 500 and 510 is formed of an elastic material and may be formed of a general knee band or the like wrapping the knee. In addition, a tunnel-shaped first rear tunnel 504 is formed at the rear of the first band 500 so that the (1-2)th lower string 314 (first lower leg string) is guided, and a tunnel-shaped second rear tunnel 514 is formed at the rear of the second band 510 so that the (2-2)th lower string 324 (second lower leg string) is guided. In addition, the (1-2)th lower string 314 (first lower leg string) is connected to the first rear tunnel 504 of the first band 500 and extends in the direction of the user's first foot F1, and the (2-2)th lower string 324 (second lower leg string) is connected to the second rear tunnel 514 of the second band 500 and extends in the direction of the user's second foot F2.

The first knee string 600 is formed in a ring shape, and one side thereof is coupled to the user's first foot F1 and the other side thereof passes through a front of the first band 500 and is coupled to an upper side of the (1-2)th lower string 314 (first lower leg string). The second knee string 610 is formed in a ring shape, and one side thereof is coupled to the user's second foot F2 and the other side thereof passes through a front of the second band 510 and is coupled to an upper side of the (2-2)th lower string 324 (second lower leg string). Here, a first front tunnel 502 in a tunnel shape is formed on both front sides of the first band 500 so that the first knee string 600 is guided, and a second front tunnel 512 in a tunnel shape is formed on both front sides of the second band 510 so that the second knee string 610 is guided. In addition, the first knee string 600 and the second knee string 610 are each formed of an elastic material, and may be formed of, for example, a rubber band.

Figure 4:
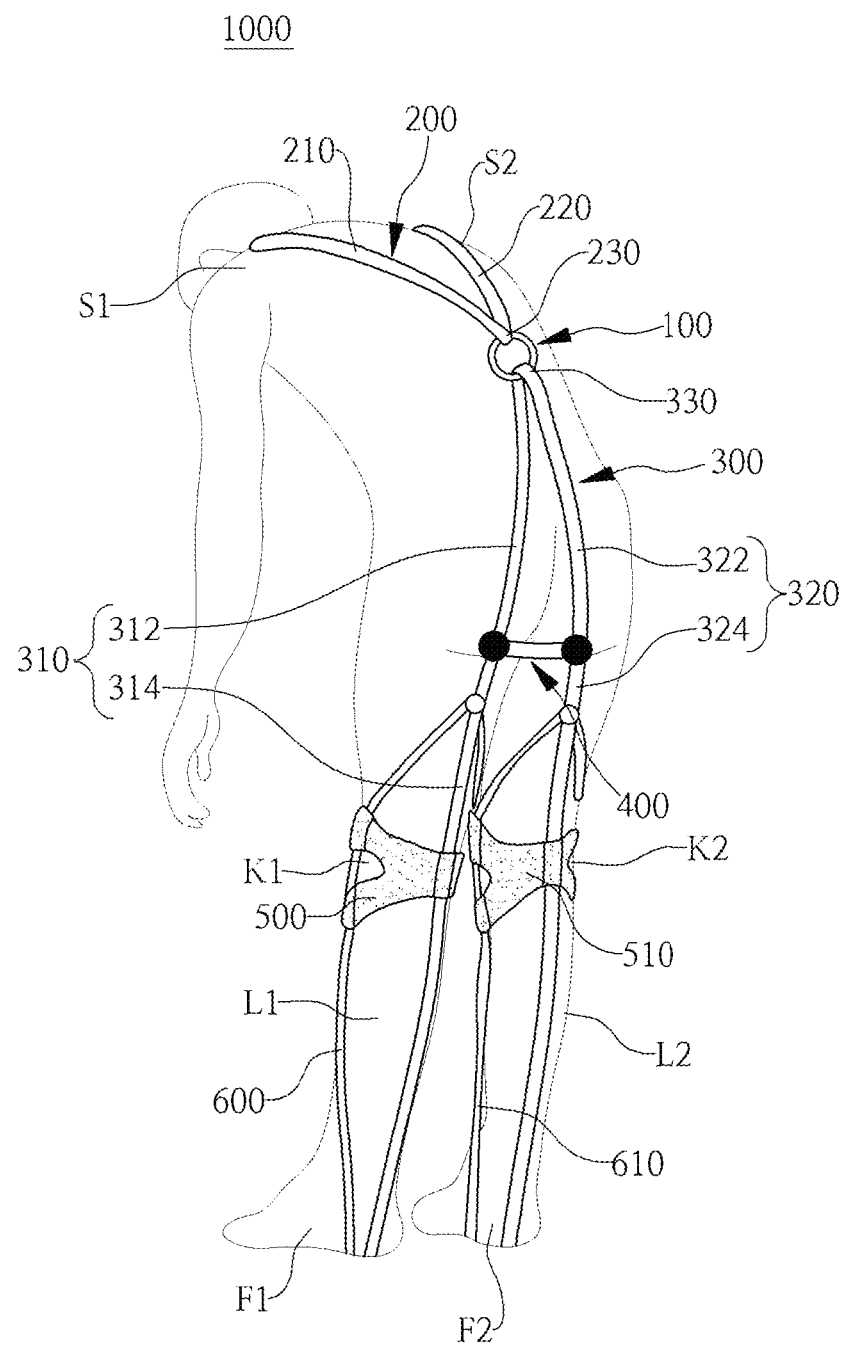
FIG. 4 is a diagram schematically illustrating a state in which a user wearing a wearable device using a flexible non-powered variable impedance mechanism according to an embodiment of the present disclosure performs an erroneous movement of bending his upper body.
Figure 5:
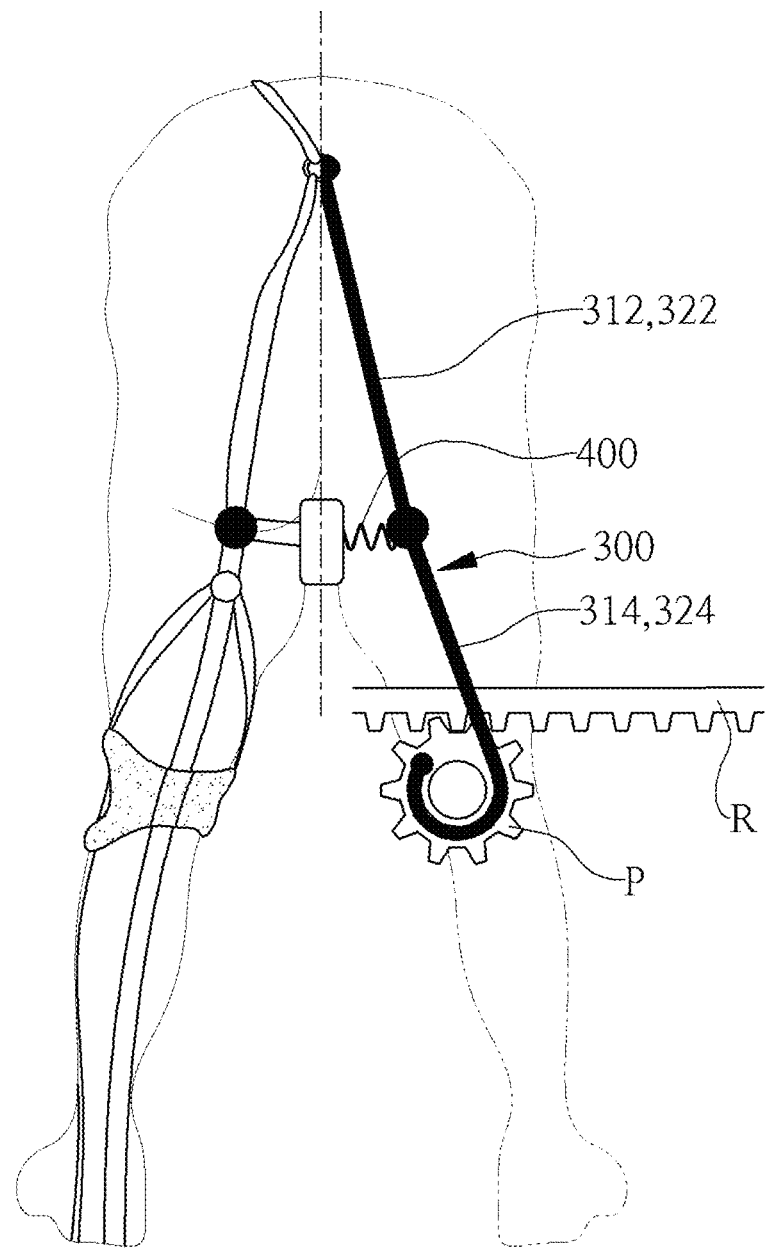
FIG. 5 is a diagram schematically illustrating a mechanism applied by an upper cable and a lower cable to an upper body in a process in which a user wearing a wearable device using a flexible non-powered variable impedance mechanism according to an embodiment of the present disclosure performs an incorrect movement of bending the upper body.

FIG. 4 is a diagram schematically illustrating a state in which a user wearing a wearable device using a flexible non-powered variable impedance mechanism according to an embodiment of the present disclosure performs an erroneous movement of bending his upper body, and FIG. 5 is a diagram schematically illustrating a mechanism applied by an upper cable and a lower cable to an upper body in a process in which a user wearing a wearable device using a flexible non-powered variable impedance mechanism according to an embodiment of the present disclosure performs an incorrect movement of bending the upper body.

Referring to FIGS. 4 and 5, a movement of bending the upper body, that is, a movement of bending the back, while the user fixes the first and second knees K1 and K2 to straighten during a squat exercise or lifting work process is an incorrect movement. This incorrect movement causes the user to pull the upper cable 200 in the opposite direction of the waist, so that the (1-2)th lower string 314 (first lower leg string) and the (2-2)th lower string 324 (second lower leg string) are moved to be close to the (1-1)th lower string 312 (first lower body string) and the (2-1)th lower string 322 (second lower body string) in a straight line, and the upper cable 200 and the lower cable 300 become taut.

If this is described as an operation of a virtual rack gear R and a virtual pinion gear P, the rack gear R is located along the elastic portion 400, and the (1-2)th lower string (314) (first lower leg string) and the (2-2)th lower string 324 (second lower leg string) are connected to the pinion gear P that is moved along the rack gear R. Also, when the upper cable 200, the (1-2)th lower string 314 (first lower leg string), and the (2-2)th lower string 324 (second lower leg string) are pulled upward, the (1-2)th lower string 314 (first lower leg string) and the (2-2)th lower string 324 (second lower leg string) are moved toward the center of the body along the pinion gear P. Here, the (1-2)th lower string 314 (first lower leg string) and the (2-2)th lower string 324 (second lower leg string) are moved to be close to the (1-1)th lower string 312 (first lower body string) and the (2-1)th lower string 322 (second lower body string) in a straight line, and the upper cable 200 is moved upward along the user's body.

Meanwhile, as the upper cable 200 moves upward, tension of the upper cable 200 and the lower cable 300 increases, so that the upper cable 200 and the lower cable 300 apply pressure in a direction in which the user's upper body is straightened, thereby interfering with the user hunching the back. Then, the user may feel that the movement of hunching the back is limited, may recognize that the movement of hunching the back is wrong, and may perform an exercise or work in a correct posture.

Figure 6:
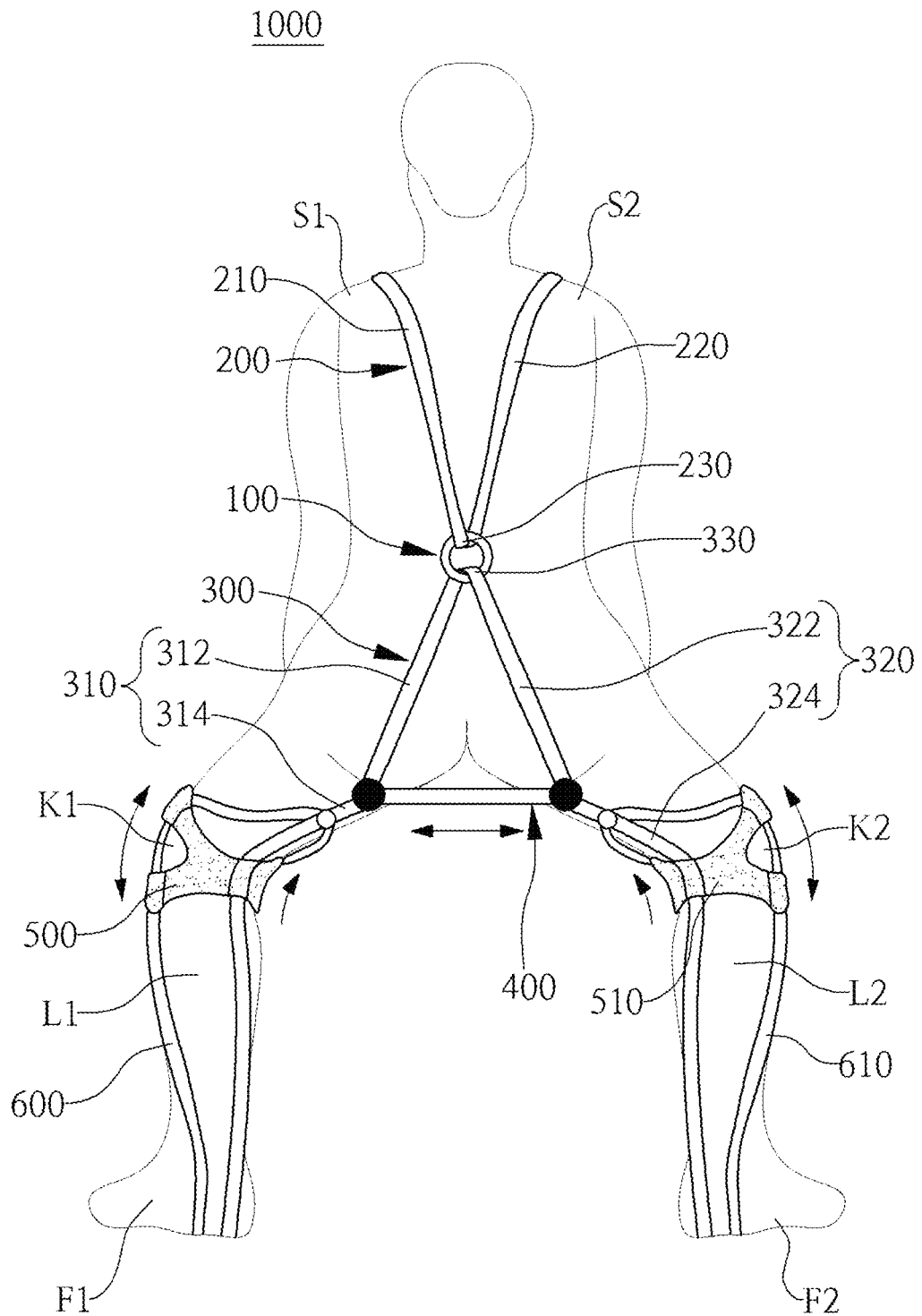
FIG. 6 is a diagram schematically illustrating a state in which a user wearing a wearable device using a flexible non-powered variable impedance mechanism according to an embodiment of the present disclosure performs normal movement of bending a knee.
Figure 7:
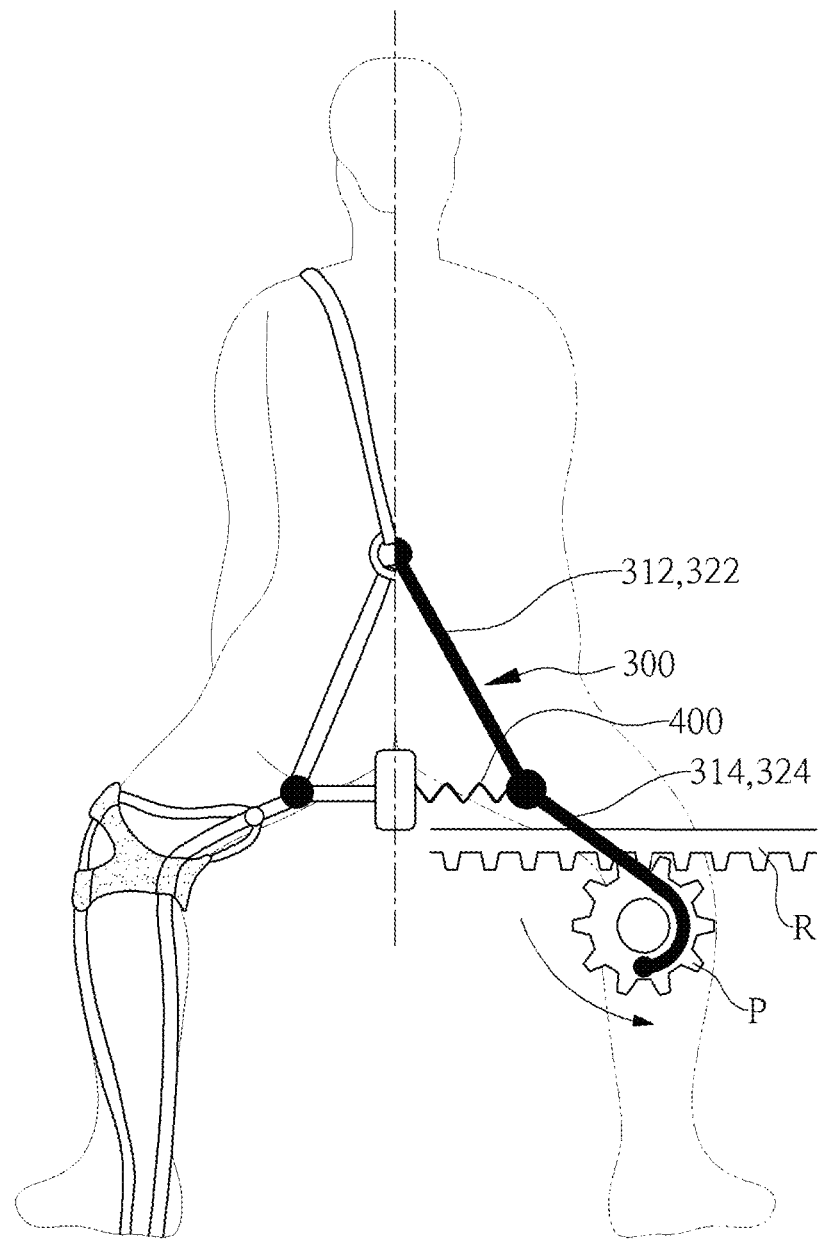
FIG. 7 is a schematic diagram illustrating a mechanism applied by an elastic portion to the upper body in a process of performing a normal movement of bending a knee by a user wearing a wearable device using a flexible non-powered variable impedance mechanism according to an embodiment of the present disclosure.

FIG. 6 is a diagram schematically illustrating a state in which a user wearing a wearable device using a flexible non-powered variable impedance mechanism according to an embodiment of the present disclosure performs normal movement of bending a knee, and FIG. 7 is a schematic diagram illustrating a mechanism applied by an elastic portion to the upper body in a process of performing a normal movement of bending a knee by a user wearing a wearable device using a flexible non-powered variable impedance mechanism according to an embodiment of the present disclosure.

Referring to FIGS. 6 and 7, during the squat exercise or lifting work process, the user movement of bending the first and second knees K1 and K2 outward, while moving the first and second knees K1 and K2, in a state in which the user straightens the back is a normal movement moving along a predetermined trace, such a normal operation induces the connection portion 100 to move downward as a distance between the first lower string 310 and the second lower string 320 increases, and the upper cable 200 connected to the connection portion 100 induces the upper body of the user to be straightened.

If this is described as an operation of a virtual rack gear R and a virtual pinion gear P, when the distance between the first lower string 310 and the second lower string 320 increases, the (1-2)th lower string 314 (first lower leg string) and the (2-2)th lower string 324 (second lower leg string) are moved along the pinion gear P in a direction away from the center of the body. At this time, as the (1-2)th lower string 314 (first lower leg string) and the (2-2)th lower string 324 (second lower leg string) are folded in a direction away from the (1-1)th lower string 312 (first lower body string) and the (2-1)th lower string 322, the distance between the (1-2)th lower string 314 (first lower leg string) and the (2-2)th lower string 324 (second lower leg string) is increased. Also, as the distance between the (1-2)th lower string 314 (first lower leg string) and the (2-2)th lower string 324 (second lower leg string) increases, the lower connection string 330 induces the first and second connection portions 410 and 420 downward, and the upper cable 200 connected to the first and second connection portions 410 and 420 is pulled downward so that the upper body of the user is straightened, so that the user takes a posture of sitting with his or her back straight. That is, according to an angle of the first and second knees K1 and K2 taken by the user, the angle between the (1-1)th lower string 312 (first lower body string) and the (1-2)th lower string 314 (first lower leg string) and the angle between the (2-1)th lower string 322 (second lower body string) and the (2-2)th lower string 324 (second lower leg string) vary, thereby changing an impedance mechanism experienced by the user.

In addition, as the distance between the first lower string 310 and the second lower string 320 increases, the elastic portion 400 increases to store a lot of energy and apply pressure so that the distance between the first lower string 310 and the second lower string 320 decreases. Such pressure assists the user's muscle strength like a spring when the user takes a posture of getting up, allowing the user to work with less fatigue than before in the process of lifting an object or taking a posture of getting up, thereby increasing work efficiency.

Meanwhile, the first and second upper strings 210 and 220 and the first and second lower strings 310 and 320 are configured to be adjustable in length, so that strength of posture correction may be adjusted according to a total length. For example, when the length of the first and second upper strings 210 and 220 and the first and second lower strings 310 and 320 is the basic length, a posture of straightening the back right and bending only the legs may be induced, and when the length of the first and second upper strings 210 and 220 and the first and second lower strings 310 and 320 is slightly greater than the basic length, hunching the back may be allowed to some extent.

Figure 8:
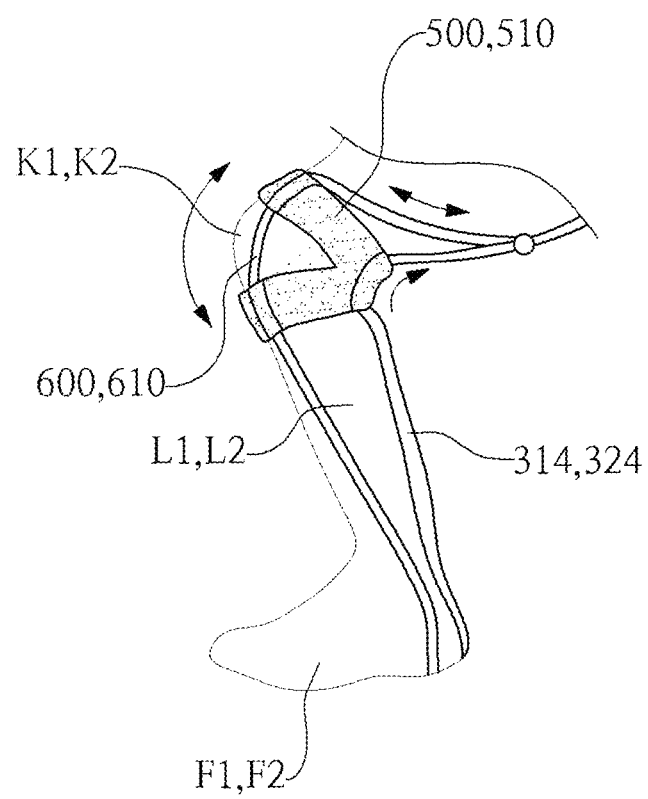
FIG. 8 is a diagram illustrating a direction of force induced by a knee string to the leg in the process of performing a normal movement of bending the knee by a user wearing a wearable device using a flexible non-powered variable impedance mechanism according to an embodiment of the present disclosure.

FIG. 8 is a diagram illustrating a direction of force induced by a knee string to the leg in the process of performing a normal movement of bending the knee by a user wearing a wearable device using a flexible non-powered variable impedance mechanism according to an embodiment of the present disclosure.

Referring to FIGS. 6 and 8, during the squat exercise or lifting work process, when the user takes a posture of bending the first and second knees K1 and K2 outward, while moving the first and second knees K1 and K2, in a state in which the user straightens the back, an upward pressure is applied to the lower cable 300. Then, the first knee string 600 and the second knee string 610 connected to the lower cable 300 extend upward, so that the first knee string 600 and the second knee string 610 located in front of the first band 500 and the second band 510 have increased tension due to elasticity.

Accordingly, the first knee string 600 and the second knee string 610 apply pressure in a direction in which the user's first knee K1 and second knee K2 are spread, so that the user's action occurs. That is, when the user takes a posture of spreading the first knee K1 and the second knee K2, pressure assists the user's muscle strength, allowing the user to work with less fatigue than before in the process of lifting an object or taking a posture of getting up, thereby increasing work efficiency.

Figure 9:
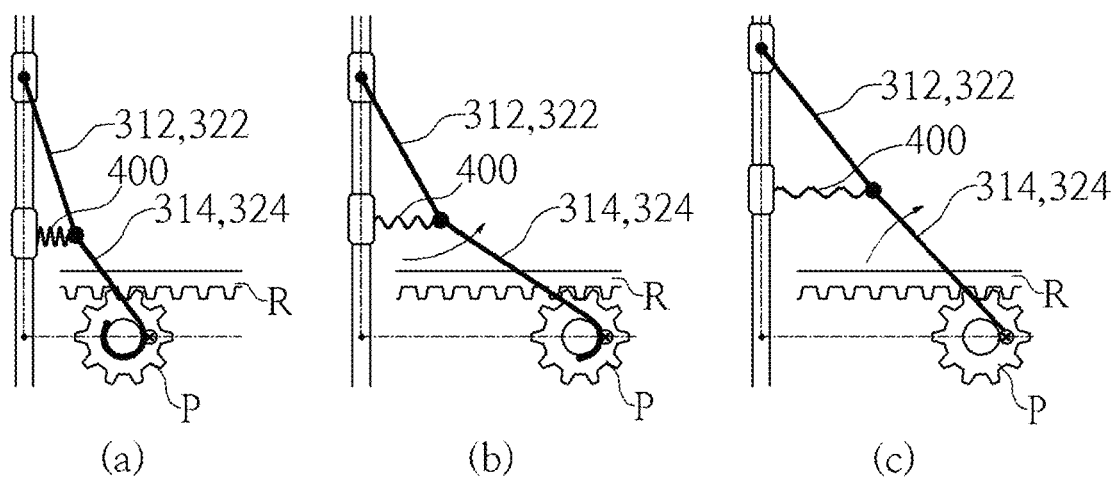
FIG. 9 is a diagram schematically illustrating a general mechanism of a process in which a user wearing a wearable device using a flexible non-powered variable impedance mechanism according to an embodiment of the present disclosure performs a movement.

FIG. 9 is a diagram schematically illustrating a general mechanism of a process in which a user wearing a wearable device using a flexible non-powered variable impedance mechanism according to an embodiment of the present disclosure performs a movement.

Referring to (a) of FIG. 9, the user is in a basic state of standing comfortably.

Referring to (b) of FIG. 9, the user performs a normal movement of bending the first and second knees K1 and K2, while moving the first and second knees K1 and K2 outward. Then, as the pinion gear P is moved outward, the (1-2)th lower string 314 (first lower leg string) and the (2-2)th lower string 324 (second lower leg string) are folded in a direction away from the (1-1)th lower string 312 (first lower body string) and the (2-1)th lower string 322 (second lower body string), which pulls the first and second upper strings 210 and 220 connected to the first and second lower strings 310 and 320, and thus, the upper body of the user is induced to be straightened.

Referring to (c) of FIG. 9, the user stops bending the first and second knees K1 and K2 and hunches his back. In this case, as the (1-2)th lower string 314 (first lower leg string) and the (2-2)th lower string 324 (second lower leg string) are moved in a direction closer to the (1-1)th lower string 312 (first lower body string) and the (2-1)th lower string 322 (second lower body string) in a straight line, the elastic portion 400 is lengthened, which rapidly increases tension of the first and second upper strings 210 and 220 and the first and second lower strings 310 and 320. Accordingly, the user recognizes that the movement of hunching his back is wrong, and the user's upper body is induced to be straightened.

As described above, the present disclosure accurately guides an exercise posture so that the knee is bent, while the knee is moving outward, when the user performs the squat movement, so that beginners who are prone to injuries due to an unfamiliar squat posture may be induced to realize the squat motion with the correct posture.

In addition, since the upper cable 200, the lower cable 300, and the elastic portion 400 are configured to have a simple structure to be worn on the body, separate exercise equipment such as a machine is not required and the user may easily make the squat movement anywhere in the state of wearing the present disclosure.

Figure 10:
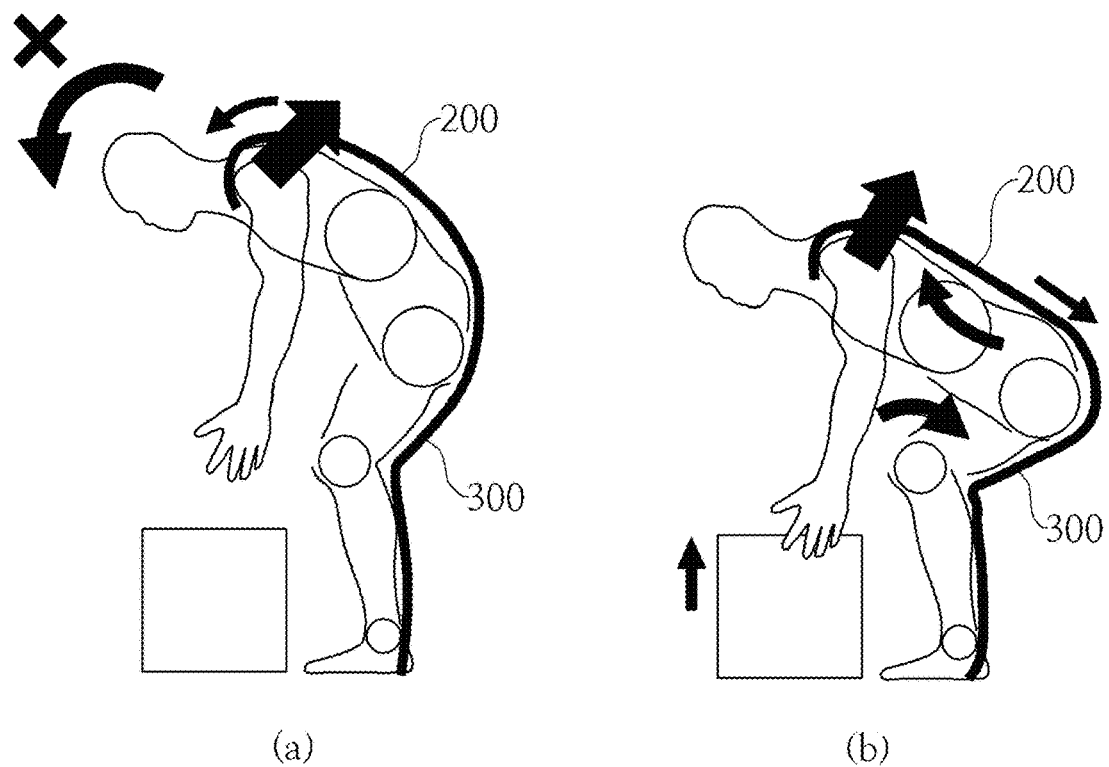
FIG. 10 is a diagram schematically illustrating a state in which a user wearing a wearable device using a flexible non-powered variable impedance mechanism according to an embodiment of the present disclosure moves his or her body in a direction of an object to perform a lifting movement.

FIG. 10 is a diagram schematically illustrating a state in which a user wearing a wearable device using a flexible non-powered variable impedance mechanism according to an embodiment of the present disclosure moves his or her body in a direction of an object to perform a lifting movement.

Referring to (a) of FIG. 10, the moment the user unconsciously hunches his back to move his body in a direction of an object, tension of the upper cable 200 and the lower cable 300 increases, so that the user hunching the back is interfered. Then, the user feels that the movement of hunching the back is limited, recognizes that the movement of hunching the back is wrong, and is induced to move his body in the direction of the object in a correct posture of straightening the back and bending the knees as shown in (b) of FIG. 10.

Figure 11:
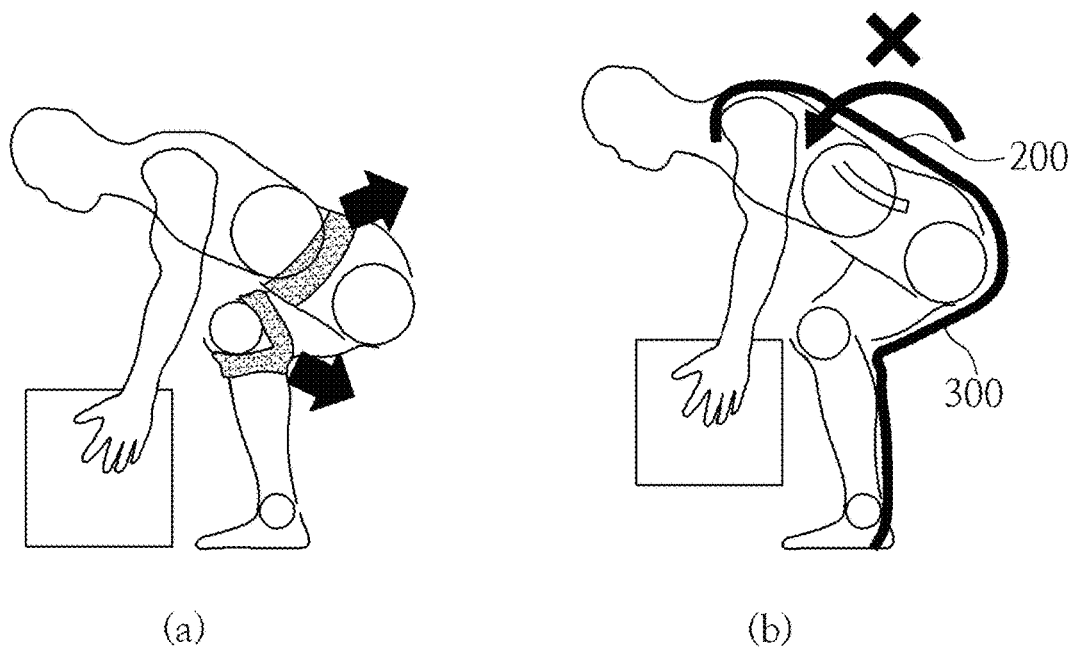
FIG. 11 is a diagram schematically illustrating a state in which a user wearing a wearable device using a flexible non-powered variable impedance mechanism according to an embodiment of the present disclosure puts an object down.

FIG. 11 is a diagram schematically illustrating a state in which a user wearing a wearable device using a flexible non-powered variable impedance mechanism according to an embodiment of the present disclosure puts down an object.

Referring to FIG. 6 and (a) of FIG. 11, the user puts down the object in the correct posture of straightening his back and bending his knees. In this state, as the elastic portion 400 is stretched, a lot of energy is stored, so that a pressure is applied in a direction in which the distance between the first lower string 310 and the second lower string 320 is close. The pressure assists the user's muscle strength when the user takes a posture of getting up, allowing the user to work with less fatigue than before in the process of lifting an object, thereby increasing work efficiency.

Meanwhile, referring to (b) of FIG. 11, the moment the user hunches his back to put down the object, tension of the upper cable 200 and the lower cable 300 increases, so that the user hunching the back is interfered. Then, the user feels that the movement of hunching the back is limited, recognizes that the movement of hunching the back is wrong, and puts the object down in the correct posture of straightening the back and bending the knees as shown in (a) of FIG. 11.

As described above, the present disclosure induces an operator to lift an object in a correct posture or safely lower an object during a lifting work process, thereby preventing injury to the operator and achieving convenience in operation.

Although the present disclosure has been described in detail in the above embodiments, the present disclosure is not limited thereto, and it is obvious to those skilled in the art that various modifications may be made within the scope of the technical idea of the present disclosure. If the modifications fall within the scope of the appended claims, the technical idea should also be regarded as belonging to the present disclosure.

What is claimed is:

1. A wearable device using a flexible non-powered variable impedance mechanism, the wearable device comprising:
    a connection portion configured to be located on a user's back and located between the user's neck and bottom;
    a continuous upper cable including a first upper string having one side configured to be worn on one side of an upper body of the user located above the connection portion and another side extending in a direction of the connection portion, a second upper string having one side configured to be worn on the other side of the upper body of the user located above the connection portion and another side extending in the direction of the connection portion, and an upper connection string attached to one side of the connection portion, having one side integrally connected to the first upper string and another side integrally connected with the second upper string;
    a multipartite lower cable including a first lower string having one side configured to be on a first leg among a pair of legs of the user and another side extending in a direction of the connection portion, a second lower string having one side configured to be on a second leg among the pair of legs of the user and another side extending in a direction of the connection portion, and a lower connection string attached to another side of the connection portion, wherein the lower connection string has one side integrally connected with the first lower string and the other side integrally connected to the second lower string;
    an elastic portion connecting the first lower string and the second lower string and formed of an elastic material;
    a first knee string configured to have one side coupled to a first foot of the user another side coupled to an upper side of the first lower string by passing through a front side of a first band;
    a second knee string configured to have one side coupled to a second foot of the user and another side coupled to an upper side of the second lower string by passing through a front side of a second band;
    the first band configured to wrap around a first knee provided on the first leg of the user and the second band configured to wrap around a second knee provided on the second leg of the user,
    wherein the first lower string is configured to extend in a direction of the first foot of the user and is connected to the first band, and the second lower string is configured to extend in a direction of the second foot of the user and is connected to the second band; and
    wherein tension based on elasticity of the first knee string and the second knee string respectively located at the front of the first band and the second band is configured to increase when the user bends their first knee and second knee, such that the first knee string and the second knee string are configured to apply pressure to the first band and the second band causing the first knee and the second knee to spread apart from each other.

2. The wearable device of claim 1, wherein a first connection portion and a second connection portion are mounted on both sides of the elastic portion, respectively,
    the first lower string includes a first lower body string having one side connected to one side of the lower connection string and another side connected to one side of the first connection portion and a first lower leg string having one side connected to the other side of the first connection portion and another side configured on the first band; and
    the second lower string includes a second lower body string having one side connected to another side of the lower connection string and another side connected to one side of the second connection portion and a second lower leg string having one side connected to another side of the second connection portion and another side provided on the second band.

3. The wearable device of claim 2, wherein the first lower leg string and the second lower leg string are configured to fold in a direction away from the first lower body string and the second lower body string when the user bends their knees, while moving the knees outward, so that a distance between the lower leg string and the second lower leg string increases, and as the distance between the first lower leg string and the second lower leg string increases, the lower connection string induces the upper cable to move downward and the upper cable is configured to induce the upper body of the user to be straightened.

4. The wearable device of claim 2, wherein the first lower leg string and the second lower leg string are configured to move closer to the first lower body string and the second lower body string when the user bends the upper body and does not bend the knees, such that tension of the upper cable and the lower cable increases, and the upper cable and the lower cable apply pressure in a direction in which the upper cable and the lower cable are stretched.

5. The wearable device of claim 1, wherein one side of the first upper string is configured to be worn on a first shoulder, among a pair of shoulders located at the upper body of the user, and one side of the second upper string is configured to be worn on a second shoulder among the pair of shoulders located at the upper body of the user.

6. The wearable device of claim 1, wherein
one side of the first lower string is configured to be worn on a first foot connected to the first leg of the user, and one side of the second lower string is configured to be worn on a second foot connected to the second leg of the user.

7. The wearable device of claim 1, wherein a first front tunnel is formed at a front of the first band to guide the first knee string, a first rear tunnel is formed at a rear of the first band to guide the first lower string,
a second front tunnel is formed at a front of the second band to guide the second knee string, and a second rear tunnel is formed at a rear of the second band to guide the second lower string.

8. The wearable device of claim 1, wherein the elastic portion is configured to be located between the user's bottom and knees.

\* \* \* \* \*